United States Patent
Eckert et al.

(10) Patent No.: US 8,899,618 B2
(45) Date of Patent: Dec. 2, 2014

(54) GAS BAG ARRANGEMENTS FOR A STEERING WHEEL OF A MOTOR VEHICLE

(75) Inventors: Nick Eckert, Berlin (DE); Frank Wollny, Berlin (DE); Wolfgang Thonhauser, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 13/807,698

(22) PCT Filed: Jun. 29, 2011

(86) PCT No.: PCT/EP2011/060929
§ 371 (c)(1),
(2), (4) Date: Dec. 28, 2012

(87) PCT Pub. No.: WO2012/001058
PCT Pub. Date: Jan. 5, 2012

(65) Prior Publication Data
US 2013/0093171 A1    Apr. 18, 2013

(30) Foreign Application Priority Data

Jun. 30, 2010   (DE) .......................... 10 2010 030 772
Aug. 25, 2010   (DE) .......................... 10 2010 039 759

(51) Int. Cl.
*B60R 21/231*   (2011.01)
*B60R 21/203*   (2006.01)
*B60R 21/2338*  (2011.01)

(52) U.S. Cl.
CPC ........... *B60R 21/2338* (2013.01); *B60R 21/203* (2013.01); *B60R 21/231* (2013.01); *B60R 2021/23382* (2013.01)
USPC ....................................... 280/731; 280/743.2

(58) Field of Classification Search
CPC .. B60R 21/203; B60R 21/231; B60R 21/233; B60R 21/2338; B60R 2021/231; B60R 2021/23382
USPC ............................................... 280/731, 743.2
See application file for complete search history.

(56) References Cited

U.S. PATENT DOCUMENTS

| 3,945,665 A | 3/1976 | Tsutsumi et al. |
| 5,253,892 A | 10/1993 | Satoh |

(Continued)

FOREIGN PATENT DOCUMENTS

| DE | 4028344 A1 | 4/1991 |
| DE | 4240760 A1 | 6/1993 |

(Continued)

OTHER PUBLICATIONS

International Search Report from the International Bureau of WIPO for International Appiicaton No. PCT/EP2011/060929dated Jul. Oct. 21, 2011 (3 pages).

(Continued)

*Primary Examiner* — Paul N Dickson
*Assistant Examiner* — Timothy Wilhelm
(74) *Attorney, Agent, or Firm* — Fitch Even Tabin & Flannery, LLP (57) ABSTRACT

A gasbag arrangement for a steering wheel of a motor vehicle is provided. The gasbag arrangement includes a gasbag which can be inflated for protecting a vehicle occupant. The gasbag, when inflated and mounted in the vehicle, includes an indentation in a portion that points towards the vehicle floor in the straight-ahead position of the steering wheel for reducing the expansion of a gasbag in the direction of a body region extending below the thorax region of the vehicle occupant such that a load on that body region during an impact of the vehicle occupant on the gasbag is minimized. According to another aspect a gasbag arrangement includes a gasbag which, when inflated and mounted in the vehicle, includes a side facing towards the vehicle floor and extending essentially parallel to a plane spanned by the longitudinal vehicle direction and the transverse vehicle direction.

10 Claims, 4 Drawing Sheets

(56) References Cited

U.S. PATENT DOCUMENTS

| | | | |
|---|---|---|---|
| 5,358,273 A * | 10/1994 | Onishi et al. | 280/743.1 |
| 5,380,038 A * | 1/1995 | Hawthorn et al. | 280/730.1 |
| 6,227,568 B1 | 5/2001 | Adomeit et al. | |
| 7,131,664 B1 * | 11/2006 | Pang et al. | 280/743.2 |
| 7,152,880 B1 * | 12/2006 | Pang et al. | 280/743.2 |
| 7,198,290 B2 * | 4/2007 | Yamada et al. | 280/731 |
| 7,360,791 B2 * | 4/2008 | Yamada | 280/743.2 |
| 7,367,586 B2 * | 5/2008 | Chen et al. | 280/743.2 |
| 7,484,757 B2 * | 2/2009 | Thomas et al. | 280/743.2 |
| 7,607,683 B2 * | 10/2009 | Fischer et al. | 280/730.1 |
| 7,625,008 B2 * | 12/2009 | Pang et al. | 280/743.1 |
| 7,946,619 B2 * | 5/2011 | Mendez | 280/743.1 |
| 8,011,691 B2 * | 9/2011 | Urushibata et al. | 280/743.2 |
| 8,196,957 B2 * | 6/2012 | Kubo et al. | 280/743.2 |
| 8,371,612 B2 * | 2/2013 | Williams | 280/743.2 |
| 2003/0168842 A1 * | 9/2003 | Igawa | 280/743.2 |
| 2003/0218325 A1 | 11/2003 | Hasebe et al. | |
| 2003/0230883 A1 | 12/2003 | Heym | |
| 2005/0098992 A1 * | 5/2005 | Yamada et al. | 280/743.1 |
| 2005/0098994 A1 * | 5/2005 | Matsumura | 280/743.1 |
| 2005/0212276 A1 | 9/2005 | Yamada | |
| 2007/0132222 A1 | 6/2007 | Thomas et al. | |
| 2008/0048420 A1 | 2/2008 | Washino | |
| 2008/0116669 A1 * | 5/2008 | Adachi et al. | 280/730.1 |
| 2009/0152840 A1 | 6/2009 | Choi | |
| 2010/0007124 A1 | 1/2010 | Fischer et al. | |
| 2012/0205900 A1 * | 8/2012 | Mallinger et al. | 280/743.2 |
| 2013/0181429 A1 * | 7/2013 | Weng et al. | 280/731 |

FOREIGN PATENT DOCUMENTS

| | | |
|---|---|---|
| DE | 19519998 A1 | 12/1996 |
| DE | 102005013525 A1 | 11/2005 |
| DE | 202006001826 U1 | 6/2006 |
| DE | 60301361 T2 | 9/2006 |
| DE | 102006056919 A1 | 6/2008 |
| DE | 102008054316 A1 | 6/2009 |
| DE | 102009033256 A1 | 2/2010 |
| GB | 2237248 A | 5/1991 |
| JP | 2003-335203 A | 11/2003 |
| JP | 2004-249960 A | 9/2004 |
| JP | 2005-271736 A | 10/2005 |
| JP | 2006-341780 A | 12/2006 |
| JP | 2008-049858 A | 3/2008 |

OTHER PUBLICATIONS

English translation of the International Preliminary Report on Patentability (Chapter I or Chapter II of the Patent Cooperation Treaty) from the International Bureau of WIPO for International Application No. PCT/EP2011/060929 dated Jan. 17, 2013, 9 pages.

Office Action issued in counterpart Japanese Application No. 2013-517275 dated Apr. 8, 2014 and English translation of same (4 pages).

* cited by examiner

GAS BAG ARRANGEMENTS FOR A STEERING WHEEL OF A MOTOR VEHICLE

CROSS-REFERENCE TO RELATED APPLICATIONS

This application is a U.S. National Phase Patent Application of International Patent Application Number PCT/EP2011/060929, filed on Jun. 29, 2011, which claims priority of German Patent Application Number 10 2010 030 772 6, filed on Jun. 30, 2010, and of German Patent Application Number 10 2010 039 759 8, filed on Aug. 25, 2010, which are hereby incorporated herein by reference in their entirety.

FIELD

The invention relates to gasbag arrangements for a steering wheel of a motor vehicle.

BACKGROUND

Gasbag arrangements which for the protection of a driver of a motor vehicle comprise a gasbag integrated into the steering wheel of the vehicle are known from the prior art. It is also known to provide tethers extending in the interior of the gasbag in order to define the shape of the inflated gasbag.

SUMMARY

The problem to be solved by the present invention is to provide a gasbag arrangement for a steering wheel of a motor vehicle whose gasbag has good restraint capabilities and is configured in such a way that the load on the vehicle occupant during an impact on the gasbag is minimized.

According to an exemplary embodiment of the invention a gasbag arrangement for a steering wheel of a motor vehicle is provided, comprising
 a gasbag which can be inflated for protecting a vehicle occupant, wherein
 the gasbag, when inflated and mounted in the vehicle, comprises an indentation in a portion that points towards the vehicle floor in the straight-ahead position of the steering wheel for reducing the expansion of a gasbag in the direction of a body region extending below the thorax region of the vehicle occupant such that a load on that body region during an impact of the vehicle occupant on the gasbag is minimized.

The indentation, in particular, is positioned in such a way that the abdominal region of the vehicle occupant to be protected at least partially can move into the indentation during a collision of the vehicle such that the load on this susceptible body region is reduced. The thorax and the head region of the vehicle occupant, however, can impact on a portion of the gasbag above the indentation such that the gasbag at the same time provides good restraint capabilities and a reduced load on the abdominal region.

The indentation is positioned in such a way (with respect to the straight-ahead position of the steering wheel) that a plane spanned by the steering axis and the vertical vehicle axis (z-axis) runs through the indentation (in particular through the bottom of the indentation), wherein a vertical vehicle axis is considered that intersects the steering wheel axis. The indentation is thus arranged in a "6-o'clock-position" with respect to the steering wheel, i.e. completely be/owe plane spanned by the transverse vehicle and the longitudinal vehicle direction (i.e. a horizontal plane) running through the centre of the steering wheel.

In particular, the indentation is arranged symmetrically with respect to the plane spanned by the steering axis and the vehicle vertical axis. When the vehicle occupant is in a normal seating position on the vehicle seat also a plane in which the steering axis and the spine of the vehicle occupant are located runs through the indentation, wherein the indentation is arranged, for example, centered with respect to the vehicle occupant.

Furthermore, the indentation faces towards the seating area of the vehicle seat, i.e. towards the thighs of the vehicle occupant when the vehicle occupant is in normal seating position. It is also conceivable that the gasbag and the indentation are configured in such a way that the bottom portion of the indentation extends at least partially and at least essentially parallel to the seating area of the vehicle seat.

Due to the indentation, the inflated gasbag comprises a first, middle region which extends along a plane running parallel to the steering wheel rim plane of the steering wheel or viewed in vertical vehicle direction has a smaller expansion towards the vehicle floor than a second region of the gasbag laterally abutting the first region. In particular, the gasbag comprises two lateral regions arranged on different sides of the middle region which have a larger expansion towards the vehicle floor than the middle region. In particular, a portion facing towards the vehicle floor of an outer side of the middle region forms a bottom of the indentation while the other portions of the gasbag laterally abutting the middle region form side walls of the indentation.

For example, the indentation is configured in such a way that its bottom (which in particular is formed as a plane)—viewed in vertical vehicle direction—is located essentially at the level of the lower side of the steering wheel rim of the steering wheel. The "lower side" of the steering wheel rim is the portion of the steering wheel rim which has the smallest distance from the vehicle floor. The regions of the gasbag laterally abutting the indentation, however, extend beyond the steering wheel rim towards the vehicle floor and thus safely cover the steering wheel rim while the indentation has the effect that in particular the abdominal region of the vehicle occupant impacts on the gasbag delayed or not at all.

It is, however, also conceivable that the indentation is formed deeper, i.e. its bottom region is located between a horizontal plane extending through the centre of the steering wheel and the lower side of the steering wheel rim. Furthermore, it is, of course, also conceivable that the indentation extends shallower, i.e. its bottom—viewed in a vertical vehicle direction—is located outside the steering wheel rim, i.e. it comprises a smaller distance to the vehicle floor than the steering wheel rim.

According to another exemplary aspect, the invention also relates to a gasbag arrangement for a steering wheel of a motor vehicle comprising
 a gasbag which can be inflated for protecting a vehicle occupant, wherein
 the gasbag, when inflated and mounted in the vehicle, comprises a side facing towards the vehicle floor and extending essentially parallel to a plane spanned by the longitudinal vehicle direction and the transverse vehicle direction.

For example, the gasbag according to the second aspect of the invention is configured in such a way its lower side (i.e. its side that faces towards the vehicle floor) is formed at least essentially flat and in particular extends at least essentially parallel to a seating area of the driver seat. In particular, the gasbag also can be configured in such a way that its side facing towards the vehicle floor extends parallel to the plane spanned by the longitudinal vehicle and a vertical vehicle direction (i.e. a horizontal plane) over essentially the complete expansion of the gasbag in the longitudinal vehicle direction.

According to a third exemplary aspect of the invention, the gas bag, when inflated and mounted in the vehicle and viewed in the vertical vehicle direction and towards the vehicle floor, essentially does not extend beyond the steering wheel rim of the steering wheel. For example, the lower side (the side facing towards the vehicle floor) of the gasbag, when viewed in vertical vehicle direction, extends at least essentially at the level of the lower side of the steering wheel rim. The lower side of the steering wheel rim, as already set forth above, is the section of the steering wheel rim that has the smallest distance to the vehicle floor of the vehicle. However, it is not excluded that the lower side of the gasbag is located between the centre of the steering wheel and lower side of the steering wheel rim.

In particular, the lower side of the gas bag extends flatly, i.e. along a plane which is orientated, for example, horizontally or obliquely with respect to the horizontal.

According to the second and the third aspect of the invention, the gasbag does not comprise an indentation but due to the contour of its lower side is shortened (flattened) in a downward direction (towards the vehicle floor), whereby also a small load, in particular on the abdominal region of the vehicle occupant, is achieved as this body region impacts on the gasbag later than the upper body regions of the vehicle occupant or not at all.

It is noted that the expression that the gasbag "essentially" does not extent beyond the steering wheel rim of the steering wheel means that the inflated gasbag may to some extent protrude beyond the steering wheel rim; for example, the gasbag can protrude beyond the steering wheel rim downwardly by up to 20% of the radius of the steering wheel (measured in the vertical vehicle direction).

In particular, the gasbag (according to the first, second, or the third aspect of the invention) is configured in such a way that in the inflated state it comprises a larger volume above the plane spanned by the steering axis and the transverse vehicle direction and extending through the centre of the steering wheel than below that plane.

According to another exemplary embodiment of the invention (according to the first, second, or the third aspect), a portion of the gasbag, when inflated and mounted in the vehicle, facing towards the chest region, in particular the breast bone, of the vehicle occupant comprises a chest region indentation in order to minimize the load on the chest region of the vehicle occupant during an impact on the gasbag. Due to that chest region indentation the gas bag in the inflated state—viewed in longitudinal vehicle direction (x-axis)—comprises a smaller expansion in the region of the chest region indentation than in particular above the chest region indentation. This has the effect that during an impact of the vehicle occupant on the gasbag in particular the head region of the vehicle occupant is restrained effectively while the load on the chest region, in particular the region of the chest bone, is small since the force introduction into the upper body region of the occupant to be protected is carried out via the adjacent gasbag regions projecting beyond the chest region indentation. The gasbag thus in addition to the (lower) indentation, which has the purpose to minimize the load on the body portions located below the chest region, comprises a further indentation (the chest region indentation) which shall counteract a high load on the chest region.

It is also conceivable that a gasbag region is arranged laterally, when viewed in vehicle transverse direction, of the bottom region of the chest region indentation, i.e. the gasbag comprises a larger expansion in the longitudinal vehicle direction lateral of and above the chest region indention than in the region of the chest region indentation. It is also possible that the chest region indentation at its lower side (towards the vehicle floor) is delimited by a further gasbag region that comprises a lager expansion in the longitudinal vehicle direction.

For example, the bottom region of the chest region indentation is formed flatly. This, however, is not necessary. Rather, it is also conceivable that the bottom region of the chest region indentation at least essentially is formed like a line, i.e. the chest region indentation has the shape of a groove, which, for example, is orientated parallel to the vertical vehicle direction with respect to the forward driving position of the steering wheel.

The gasbag can be configured in such a way that the portion (lateral portion) of the gasbag in which the chest region indention is arranged extents at least essentially parallel to a plane spanned by the transverse and the vertical vehicle direction.

According to another exemplary embodiment of the invention, the chest region indentation is generated by a least one tether connected to the gasbag and extending in the interior of the gasbag, the tether in the inflated state of the gas bag extending between a portion of the gasbag facing towards the steering wheel and a portion of the gasbag facing away from the steering wheel. In particular, the length of the tether is chosen in such a way that it reduces the expansion of the gasbag in longitudinal vehicle direction such that the chest region indention is generated.

Using the width of the ether/nits ending facing away from the steering wheel, the chest region indentation can be dimensioned; for example, its expansion in vertical vehicle direction. For example, the ending of the tether facing towards the steering wheel is smaller than the ending facing away from the steering wheel, whereby at the one hand a connection of the tether in the region of an inlet opening of the gasbag (see discussion below) is made possible and on the other hand a sufficiently large chest region indentation can be generated.

In particular, the gasbag comprises an inlet opening through which gas of a gas generator can flow into the gasbag. The tether can be connected to gasbag in the region of the inlet opening on the side of the steering wheel, i.e. with its ending facing towards the steering wheel. More particularly, a rim region of the inlet opening is fixed to a part of the gasbag arrangement (for example a module housing or a gas generator carrier) via a clamp (for example at a diffuser located in the gasbag interior or the mounting ring), wherein the connection of the ending of the tether adjacent is realized in this fixed rim region of the gas bag. Thereby forces which impact on the tether during the unfolding of the gasbag can be conveyed via the rim region. The end of the tether facing away from the steering wheel is connected to an inner side of the gasbag with another portion.

It is noted that the gasbag is formed in particular from a gasbag material (a textile material). For example, the gasbag is formed from two gasbag layers (pre-cuts) of the gasbag material, wherein the two gasbag layers are connected to one another along a circumferential seam. The tether, for example, is connected to the first gasbag layer with its ending proximate the steering wheel and to the second gasbag layer with its other ending. For example, the tether is also formed by the gasbag material.

The connection of the tether to the gasbag is realized, for example, by sewing, welding and/or, gluing, wherein, in particular, the connection of the ending of the tether proximate the steering wheel to the gasbag is carried out like a line, i.e.

along a connecting line, for example, via a sewing, welding or gluing seam, wherein the connection in particular extends linearly.

For example, the plane in which the tether extends at least partially is orientated obliquely to the plane spanned by the steering axis and the vertical vehicle direction. The orientation of the tether in particular is determined by the orientation of the connecting line along which its ending facing away from the steering wheel is connected to the gasbag. For example, this connecting line is orientated in such a way that the tether (at least in the region of the ending facing away from the steering wheel) extends along a plane which is orientated in such a way that it runs through the (lower) indentation of the gasbag. In other words, the tether is orientated towards the lower indentation which has the purpose of reducing the load on a lower body region of the vehicle occupant. Due to this orientation the geometry of the lower indentation can be influenced via the tether, wherein, in particular, the depth of the lower indentation may depend on the orientation of the tether.

According to another exemplary embodiment of the invention, the chest region indentation is generated by at least two tethers or two sections of at least one tether. In particular, the tethers and the sections, respectively, in the inflated state of the gasbag are arranged on different sides of the plane spanned by the steering axis and the vertical vehicle direction.

In case that the chest region indentation is formed by two sections of a single tether, the endings facing away from the steering wheel of the two sections are, for example, integrally connected to one another via a kink or a bending.

In other words, the tether is folded before being arranged in the gasbag and the connection to the gasbag such that the kink or the bending and two sections (in particular having the same length) are fabricated. The tether is then connected to the gasbag, in particular, in the region of the kink or the bending, for example along a line following the kink or the bending.

It is conceivable hat the chest region indentation is formed exclusively by two tethers and two sections of a tether, respectively. However, it is also possible that more than two tethers are provided; for example, at least two tethers (or sections of one tether) can be provided on both sides of the plane spanned by steering axis and the vertical vehicle direction, the tethers having a certain distance (in the vertical vehicle direction) from one another.

In particular, the tethers and the sections of a single tether, respectively, are arranged symmetrically with respect to the plane spanned by the steering axis and the vertical vehicle direction, i.e. the plane spanned by the vertical vehicle direction and the steering axis represents a symmetry plane with respect to the tethers. It is also possible that the lower indentation and/or the chest region indentation of the gasbag are formed symmetrically with respect to this symmetry plane. For example, also the complete gasbag can be formed at least essentially symmetrically with respect to the plane spent by the steering axis and the vertical vehicle direction.

According to another exemplary embodiment of the invention the gasbag comprises a reinforcement layer via which the ending of the tether facing away from the steering wheel is connected to the gasbag. In particular, the reinforcement layer protects the gasbag, in particular from a high thermal load at the beginning of the inflation of the gasbag and from higher mechanical forces during the further inflation of the gasbag. It is conceivable that the reinforcement layer is integrally formed with the tether. For example, it is also possible that the chest region indentation is realized by two sections of an integrally formed tether, as set forth above, wherein also the reinforcement layer may be integrally connected to the tether, i.e. the two sections of the tether for creating another chest region indentation and the reinforcement layer are formed from one and the same pre-cut.

The invention also relates to a steering wheel comprising the gasbag arrangement according to the invention.

BRIEF DESCRIPTION OF THE DRAWINGS

In the following the invention is discussed by means of embodiments with reference to the drawings.

DETAILED DESCRIPTION

Figure 1:
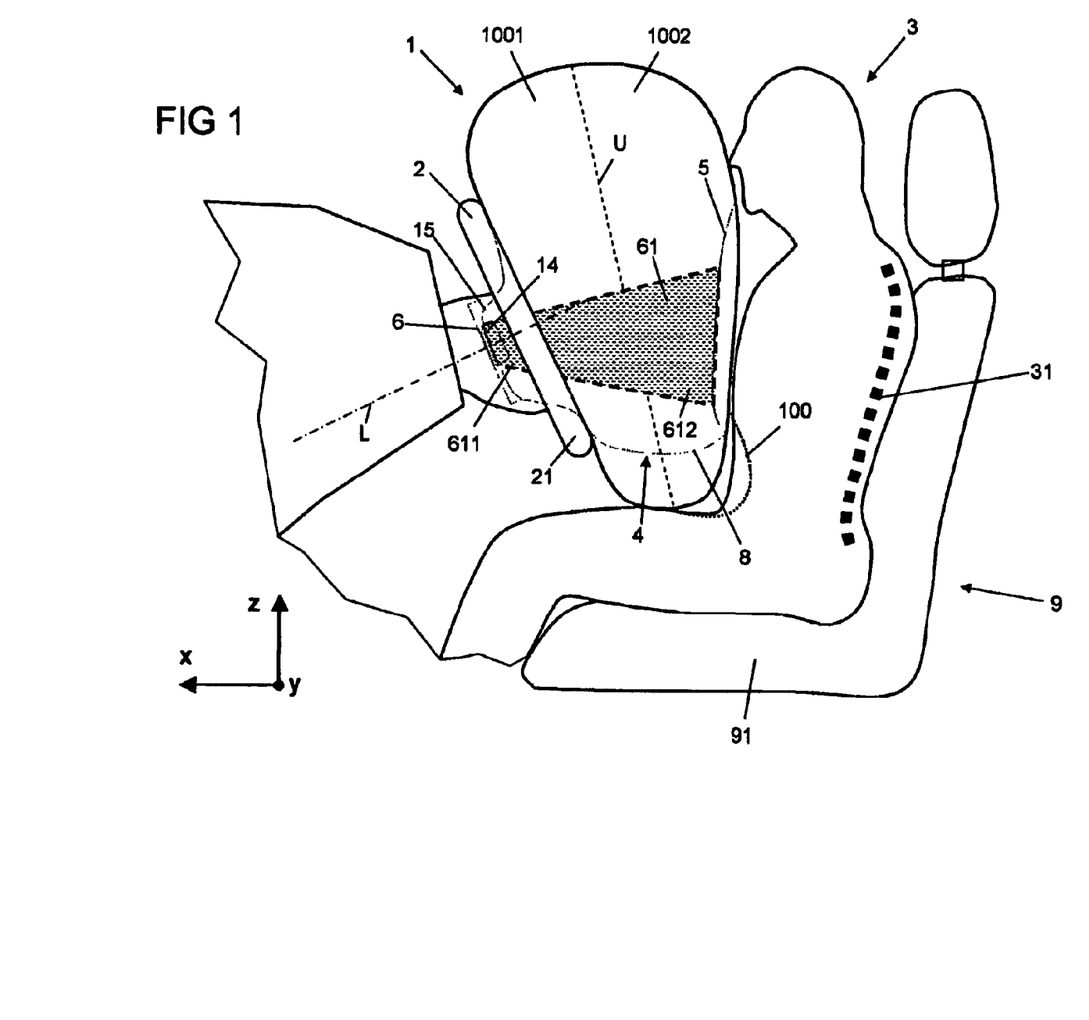
FIG. 1 shows a side view of a gasbag arrangement according to a first embodiment of the invention.
Figure 2:
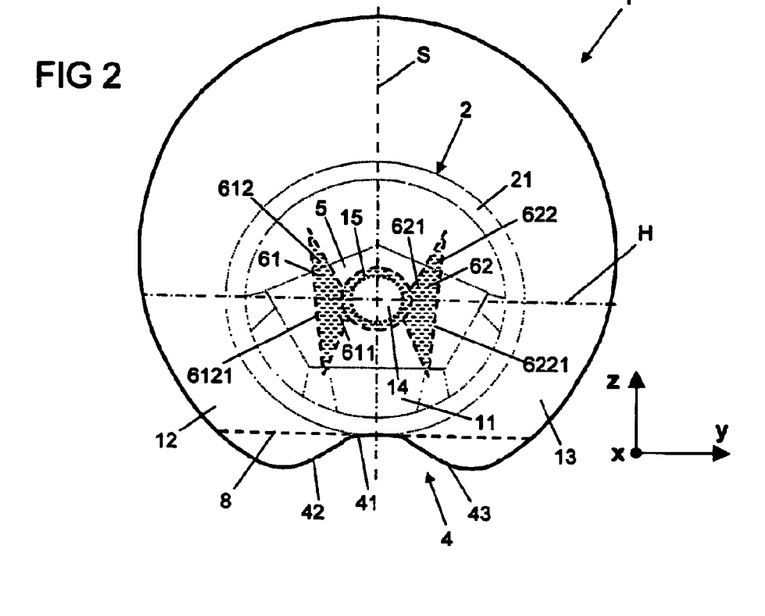
FIG. 2 shows a gasbag arrangement of FIG. 1 in top view (viewed from the vehicle occupant).

The steering wheel integrated gasbag arrangement depicted in FIGS. 1 and 2 comprises a gasbag 1 which in the shown inflated state extends between a steering wheel 2 of a vehicle and a vehicle occupant 3 located on a vehicle seat 9. The gasbag 1 comprises an indentation 4 located at its lower side, i.e. at its side which in the inflated state faces towards the vehicle floor and a seating area 91 of vehicle seat 9 on which the vehicle occupant is located, respectively (see FIG. 2), the indentation minimizing the load on a body region (in particular on the abdominal region) of the vehicle occupant located below the chest region of the vehicle occupant. The indentation 4 in particular is configured and positioned in such a way that a plane spanned by the steering axis L and the vertical vehicle direction extends through the indentation (in particular through its bottom region). For example, the indentation 4 is symmetrical with respect to this plane. In a normal seating position of the vehicle occupant 3 therefore also a plane in which the steering axis L and the spine 31 of the vehicle occupant 3 are located extends through the indentation 4.

Without the indentation 4 the inflated gasbag would extend up to the abdominal region of the vehicle occupant and would press against this body region directly after the inflation of the gasbag. The contour of the lower gasbag region without the indentation is indicated in FIG. 1 by dotted line 100. The lower indentation 4 thus provides a sectional reduction of the horizontal expansion of the lower gasbag region (i.e. the expansion in the longitudinal vehicle direction) since the gasbag 1 at least partially extends obliquely along the plane of the steering wheel rim.

According to FIG. 2, gasbag 1—viewed from the vehicle occupant—comprises an at least essentially circular contour, which, however, in the lower region forms the indentation 4. Because of the indentation 4 the gasbag 1 comprises a middle region 11 extending on both sides of a plane S spanned by the steering axis L and the vertical vehicle direction. Distant from said plane S lateral regions 12, 13 adjoin the middle region 11.

The middle region 11—viewed along the vertical vehicle direction or along the steering wheel rim plane—comprises an expansion towards the vehicle floor which is smaller than the corresponding expansion of the lateral regions 12, 13, wherein in particular the portion of the gasbag is considered that extends below a horizontal plane H extending through the steering wheel centre. The lateral regions 12, 13 are arranged on different sides of middle region 11 and in the inflated state of the gasbag face towards the vehicle longitudinal side (section 12) arranged adjacent the steering wheel 2 and towards the more distant vehicle longitudinal side (gasbag section 13), respectively.

The middle region 11 with its outer side facing towards the vehicle floor forms a bottom region 41 of the indentation 4, while the adjoining gasbag portions 12, 13 each form a side wall 42, 43 of the indentation 4. The bottom region 41 is located at the same level as a lower side of the steering wheel rim 21 of steering wheel 2, while the lateral portions 12, 13 extend beyond the steering wheel rim towards the vehicle floor in order to safely cover the steering wheel rim. Further, the bottom region at least in sections and at least essentially extends parallel to the horizontal plane H (spanned by the transverse vehicle direction and the vertical vehicle direction).

FIGS. 1 and 2 (and similarly the other Figures) illustrate the possibility to provide a lower side of the gasbag running parallel to the horizontal plane H instead of an indentation. This lower side is illustrated by the dotted line 8. It is shown that the lower side 8 extends flat and parallel to the horizontal plane H over essentially the complete lower expansion of the gasbag in vehicle longitudinal direction (X-direction) and in transverse vehicle direction (Y-direction). Furthermore, the lower side 8 is located approximately at the level of the lower side of the steering wheel rim 21, i.e. the gasbag is configured in such a way that it essentially does not extend beyond the steering wheel rim of the steering wheel 2 along the vertical vehicle direction and towards the vehicle floor in order to avoid an early impact of the abdominal region of the vehicle occupant on the gasbag.

It is also possible that the lower side of the gasbag does not extend horizontally but obliquely; this, however, in such a way that the gasbag does not extend towards the vehicle floor beyond the lower side of the steering wheel rim.

Gasbag 1—viewed from the side—comprises a kind of a V-shape, wherein a side facing towards the vehicle occupant at least essentially extends parallel to a plane spanned by the transverse and the vertical vehicle direction while a side of the gasbag facing towards the steering wheel 2 at least essentially extends parallel to the plane of the steering wheel rim.

In addition to the lower indentation 4 providing protection of a body region of the vehicle occupant below the chest region or being assigned to this region, a chest region indentation 5 can be provided in a side of the gasbag 1 facing towards the vehicle occupant, wherein the chest region indentation is located at the level of the chest region of the vehicle occupant and has the purpose to minimize the load on the chest region during an impact of the vehicle occupant on the gasbag. The chest region indentation is formed by means of two tethers 61, 62 which are arranged symmetrically on different sides of a plane (symmetry plane) S spanned by the steering axis L and the vertical vehicle axis intersecting the steering axis L.

The tethers 61, 62 are connected to a rim region 15 of gasbag 1 with its endings 611, 621 facing towards the steering wheel 2, the rim region 15 encompassing an inlet opening 14 of the gasbag formed in a gasbag layer 1001 through which gas of a gas generator (not shown) for inflating the gasbag can flow into the interior of the gasbag. It is also possible that the gas generator at least in sections protrudes into the interior of gasbag 1 through the inlet opening. The rim region 15 in particular is connected (e.g. clamped) to a gas generator carrier. 6 together with the gas generator.

Furthermore, in the rim region 15 the gasbag may be reinforced by a reinforcement layer fixed together with the rim region and being connected to the gasbag 1 via tethers 61, 62.

Due to the connection of the tethers 61, 62 to the rim region 15 a stable coupling between the tethers and the gasbag is realized which in particular counteracts vibrations of the gasbag during expansion such that the gasbag quickly assumes its intended protecting position. In particular, the gasbag and the gas generator, the gas generator carrier and a housing (not shown) are components of a steering integrated gasbag module. The endings 612, 622 of tethers 61, 62 facing away from the steering wheel 2 are also connected to an inner side of gasbag 1, wherein the connection is carried out along a—in particular linear—connecting line 6121, 6221 (in particular in the form of a glue, a welding or glue seam). The gasbag 1 is formed by two at least essentially congruent gasbag layers 1001, 1002 connected to one another along a circumferential seam U, wherein the tethers at the steering wheel side are connected with the one gasbag layer 1001 and with its endings facing away from the steering wheel to the other gasbag layer 1002.

The tethers 61, 62 furthermore in the region of their endings 612, 622 facing away from the steering wheel have a width larger than in the region of the endings 611, 621 facing towards the steering wheel. By means of the width of the endings 612, 622 facing away from the steering wheel in particular the height (viewed in vertical vehicle direction of the vehicle) of the chest region indentation 5 is determined while by means of the distance between the tethers 61, 62 along the transverse vehicle direction the width of the chest region indentation 5 is determined. Moreover, the depth of the chest region indentation 5 may be defined via the length in the vehicle longitudinal direction of the tethers 61, 62.

Figure 4:
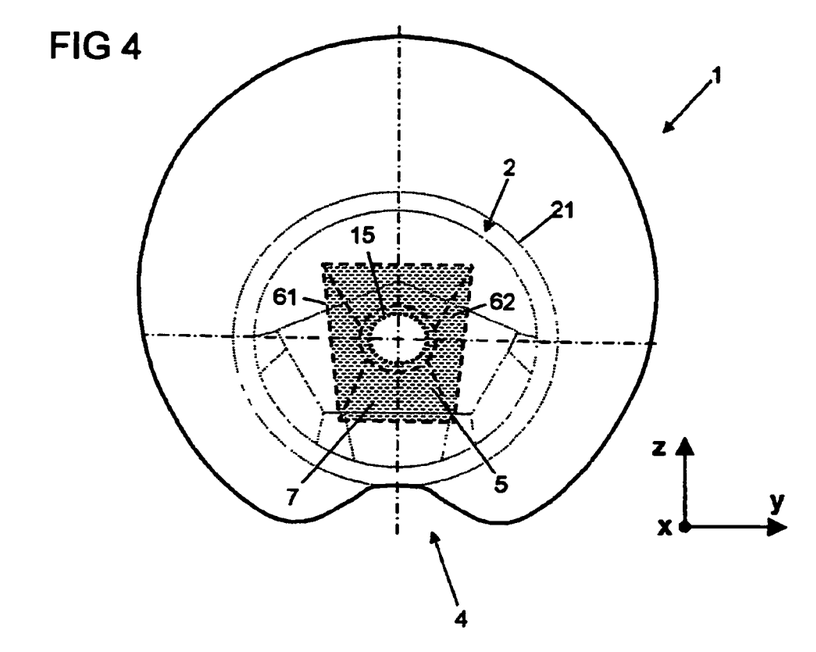
FIG. 4 shows a top view of a gasbag arrangement according to a third embodiment of the invention.

The tethers 61, 62 in particular in the region of their endings 612, 622 facing away from the steering wheel 2 are orientated along a plane which extends through the lower indentation 4, i.e. the tethers are orientated in the direction of the lower indentation 4 such that in the top view of FIG. 4 they in principle form arms of a V. By means of the orientation, in particular, of the endings 612, 622 of tethers 61, 62, i.e. in particular by means of the orientation of the connecting lines 6121, 6221, also the shape (e.g. the depth) of the lower indentation 4 may be influenced such that the load reducing effect of the lower indentation 4 can be changed by the orientation of the tethers 61, 62.

Figure 3:
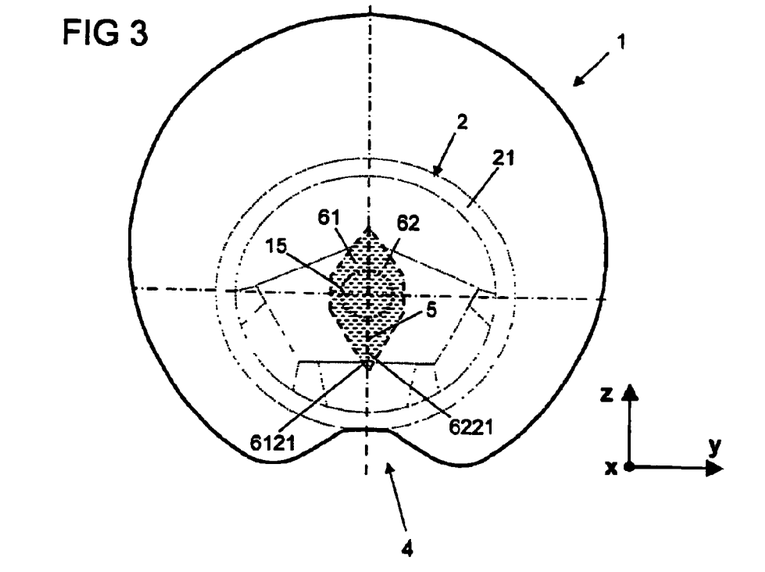
FIG. 3 shows a top view of a gasbag arrangement according to a second embodiment of the invention.

FIG. 3 relates to a modification of the embodiment of FIGS. 1 and 2. The chest region indentation 5 is also created by two tethers 61, 62. However, the endings 612, 622 facing away from the steering wheel of the tether 61, 62 are not connected to the gasbag 1 with a distance but the connecting lines 6121, 6221 overlap or are at least arranged with only a very small distance (for example, less than 10 mm) from one another. It is also conceivable that both endings 612, 622 of tethers 61, 62 are connected to the gasbag 1 via a common connecting line.

Because of this fixation of the endings 612, 622 an at least essentially longitudinal thorax region indentation 5 is created which in the example of FIG. 3 is orientated in the vertical vehicle direction. In particular, it is also possible that instead of two separate tethers a single tether is used which is folded before being connected to the gasbag such that two sections are created (replacing the tethers 61, 62) and which are connected to one another at the folding region via a kink or a bending. The tether arranged in the gasbag thus extends in the form of a V (as seen from above). The tether is then connected to the gasbag along a connecting line in the region of the kink or the bending. The two endings of the sections of the tether on the side of the steering wheel are then, for example, connected to a rim region 15 of gasbag 1 surrounding an inlet opening of the gasbag similar to the separate tether 61, 62.

FIG. 4 relates to another refinement of the embodiments discussed above. The gasbag comprises a reinforcement layer 7, which may be formed from the same material as the gasbag. The reinforcement layer 7 extends over a portion of the inner side of the gasbag 1 and between the tethers 61, 62 which are arranged according to FIG. 2.

In particular, the reinforcement layer 7 is arranged in such a way that it is located at least with a section opposite the inlet opening 14 of the gasbag in the longitudinal vehicle direction such that at least a part of the gas flowing into the gasbag impacts on the reinforcement layer 7 and thus protects the gasbag against an excessive thermal impact of the inflowing gases.

It is in particular possible that the tethers 61, 62 and the reinforcement layer 7 are integrally formed, i.e. they are fabricated from a single pre-cut, wherein, before arranging the pre-cut in the gasbag for realizing the tethers 61, 62, sections of an areal region, which shall realize the reinforcement layer 7, are folded such that the portions of the pre-cut realizing the tethers 61, 62 are connected to the reinforcement layer 7 via a kink or a bending. For example, the pre-cut is connected to the gasbag via a connection seam in the region of the kink or the bending.

Figure 5:
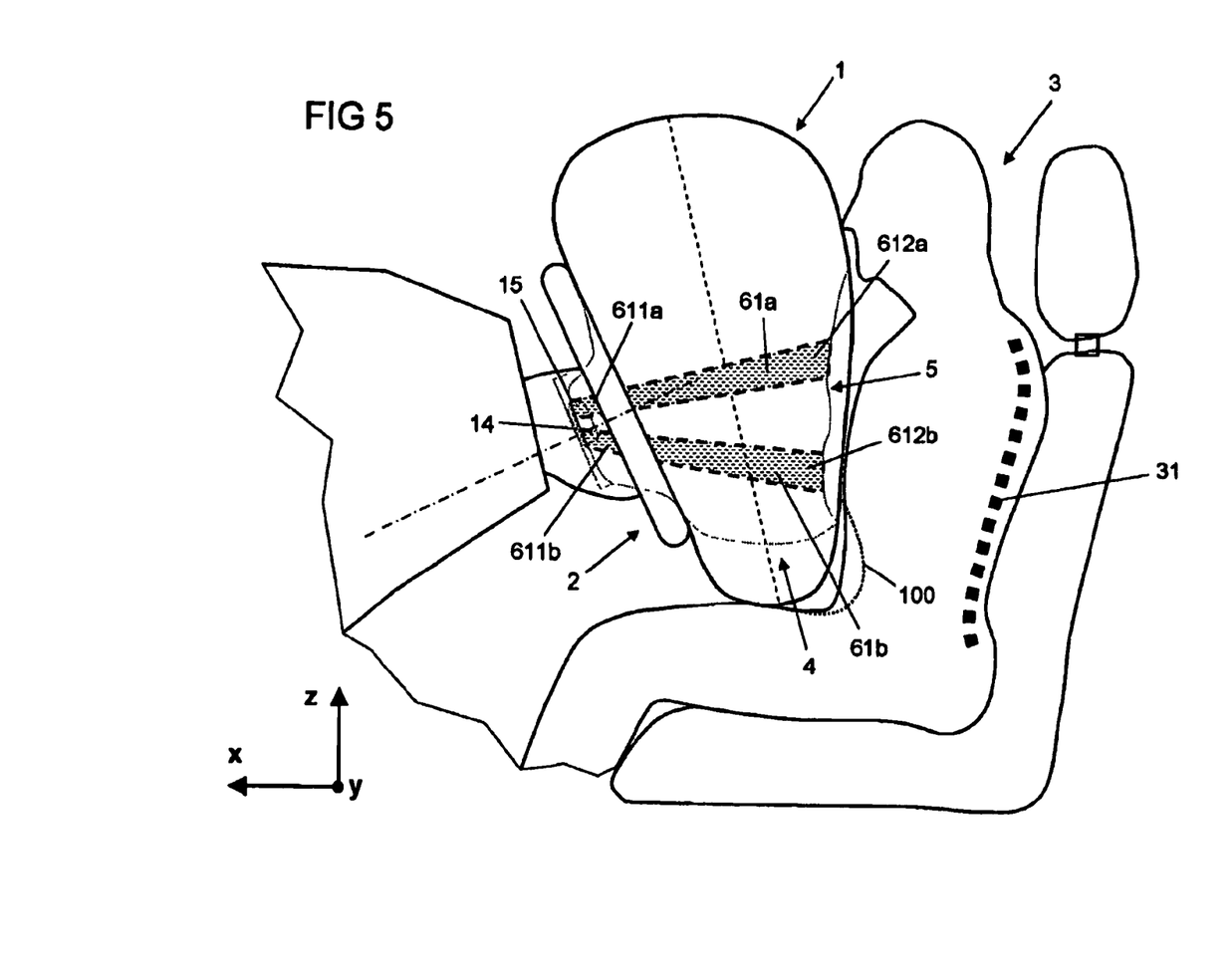
FIG. 5 shows a side view of a gasbag arrangement according to a fourth embodiment of the invention.

FIG. 5 depicts another example of the gasbag of a gasbag arrangement according to the invention. In contrast for example to FIG. 1, four tethers are arranged, wherein two of them are arranged on each side of a symmetry plane spanned by the steering axis and the vertical vehicle direction.

Since FIG. 5 shows the gasbag 1 in side view, only two tethers 61a, 61b are illustrated which are arranged on the same side of the symmetry plane. The tethers 61a, 61b in comparison to tether 61 of FIG. 1 are smaller, wherein they are arranged in a distance from one another, when viewed in the vertical vehicle direction. More particularly, the distance between the tethers 61a, 61b (and accordingly between the tethers on the other side of the symmetry plane) increases with increasing distance from steering wheel 2.

It is conceivable that the tethers which are arranged on the same side of the symmetry plane are orientated along a common plane; in particular, as already described in connection with FIG. 1, towards the lower indentation 4. Thus, in particular those connecting regions via which the endings 612a, 612b of tethers 61a, 61b facing towards the steering wheel 2 are connected to gasbag 1 are orientated towards the lower indentation 4. The endings 611a, 611b arranged in proximity of the steering wheel are, for example, also connected to rim region 15 encompassing the inlet opening 14 of the gasbag 1.

The tethers which are located on different sides of the symmetry plane can also be integrally connected to one another. For example, the upper tether 61a can be integrally formed with the upper tether (not shown in FIG. 5) on the other side of the symmetry plane; i.e. the above discussion with respect to FIG. 3.

It is noted that elements of the embodiments of FIGS. 1-5 can of course also be used in combination. For example, the tethers of FIG. 5 can be realized together with the reinforcement layer 4 shown in FIG. 4 and/or can be arranged according to FIG. 3.

The invention claimed is:

1. A gasbag arrangement for a steering wheel of a motor vehicle, comprising a gasbag which can be inflated for protecting a vehicle occupant, wherein the gasbag, when inflated and mounted in the vehicle, comprises an indentation in a portion that points towards the vehicle floor in the straight-ahead position of the steering wheel for reducing the expansion of a gasbag in the direction of a body region extending below the thorax region of the vehicle occupant such that a load on that body region during an impact of the vehicle occupant on the gasbag is minimized, and the indentation in the portion that points toward the vehicle floor comprises a bottom region that is located at the same level as a lower side of a steering wheel rim of the steering wheel, when the gasbag is inflated and mounted in the vehicle, a portion of the gasbag facing towards the thorax region of the vehicle occupant to be protected comprises a thorax region indentation in order to minimize the load on the thorax region of the vehicle occupant, and the thorax region indentation is generated by a tether extending in the interior of the gasbag, the tether extending between a portion of the gasbag that, when the gasbag is inflated, faces towards the steering wheel and a portion of the gasbag that faces away from the steering wheel.

2. The gasbag arrangement as claimed in claim 1, wherein due to the indentation the inflated gasbag comprises a first, middle region which—viewed along the vertical vehicle direction—has a smaller expansion towards the vehicle floor than a second region arranged adjacent the first region of the gasbag.

3. The gasbag arrangement as claimed in claim 1, wherein the thorax region indentation comprises a plane bottom region or a longitudinal bottom region.

4. The gasbag arrangement as claimed in claim 1, wherein the ending of the tether facing towards the steering wheel is thinner than the ending facing away from the steering wheel.

5. The gasbag arrangement as claimed in claim 1, wherein the plane in which the tether extends is orientated at least partially obliquely with respect to a plane spanned by the steering axis and the vertical vehicle direction.

6. The gasbag arrangement as claimed in claim 5, wherein the tether extends at least partially along a plane which is orientated in such a way that it passes through the indentation.

7. The gasbag arrangement as claimed in claim 1, wherein the thorax region indentation is generated by at least two tethers or two portions of at least one tether which in the inflated state of the gasbag are arranged on different sides of a plane spanned by the steering axis and the vertical vehicle direction.

8. The gasbag arrangement as claimed in claim 7, wherein the endings of the two portions of the tether facing away from the steering wheel are integrally connected to one another via a kink or a bending and the tether is connected to the gasbag in the region of the kink or the bending.

9. The gasbag arrangement as claimed in claim 7, wherein at least two tethers are arranged on each side of the plane.

10. The gasbag arrangement as claimed in claim 7, wherein the tethers or the portions of the tether are arranged symmetrically relative to the plane spanned by the steering axis and the vertical vehicle direction.

* * * * *